(12) United States Patent
Struye et al.

(10) Patent No.: US 6,392,249 B1
(45) Date of Patent: May 21, 2002

(54) METHOD FOR RECORDING AND REPRODUCING IMAGES MADE BY PENETRATING RADIATION USING ELECTROLUMINESCENT ELEMENTS

(75) Inventors: Luc Struye, Mortsel; Peter Willems, Stekene; Paul Leblans, Kontich, all of (BE)

(73) Assignee: Agfa-Gevaert, Mortsel (BE)

(*) Notice: Subject to any disclaimer, the term of this patent is extended or adjusted under 35 U.S.C. 154(b) by 0 days.

(21) Appl. No.: 09/427,028

(22) Filed: Oct. 26, 1999

Related U.S. Application Data
(60) Provisional application No. 60/119,063, filed on Feb. 8, 1999.

(30) Foreign Application Priority Data

Oct. 13, 1998 (EP) .............................. 98203790

(51) Int. Cl.⁷ ..................... G01N 23/04; G03B 42/02
(52) U.S. Cl. ................ 250/585; 250/581; 250/484.4
(58) Field of Search ......................... 250/585, 581, 250/484.4

(56) References Cited

U.S. PATENT DOCUMENTS 4,835,386 A * 5/1989 Shimura et al. ......... 250/484.4
5,038,037 A * 8/1991 Saotome .................. 250/585
5,268,569 A   12/1993 Nelson et al.

FOREIGN PATENT DOCUMENTS

EP   0 846 962 A1   6/1998
EP   0 859 244 A1   8/1998

OTHER PUBLICATIONS

Patent Abstracts of Japan, vol. 095, No. 008, Sep. 29, 1995 and JP 07 122366 A (Oki Electric Ind. Co. Ltd.), May 12, 1995.

* cited by examiner

*Primary Examiner*—Constantine Hannaher
*Assistant Examiner*—Andrew Ierael
(74) *Attorney, Agent, or Firm*—Breiner & Breiner, L.L.C.

(57) ABSTRACT

A method for recording and reproducing a radiation image including the steps of (1) causing a radiation image storage panel containing a photostimulable phosphor to absorb penetrating radiation having passed through an object or having been radiated from an object, (2) exposing the image storage panel to stimulating rays to release the radiation energy stored therein as light emission and (3) detecting the emitted light, wherein the stimulating rays are emitted by an electroluminescent element.

22 Claims, 2 Drawing Sheets

METHOD FOR RECORDING AND REPRODUCING IMAGES MADE BY PENETRATING RADIATION USING ELECTROLUMINESCENT ELEMENTS

RELATED APPLICATION

This application claims benefit of U.S. Provisional Application No. 60/119,063 filed Feb. 8, 1999.

FIELD OF THE INVENTION

This invention relates to a method for recording and reproducing images of objects made by penetrating radiation. It, relates especially to the recording and reproduction of images obtained by penetrating radiation in the field of medical diagnosis and in the field of non-destructive testing.

BACKGROUND OF THE INVENTION

In a conventional radiographic system an X-ray radiograph is obtained by X-rays transmitted image-wise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern disclosed, e.g., in U.S. Pat. No. 3,859,527, a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infrared light scans the panel to stimulate the release of stored energy as light that is detected and converted to electrical signals which are processed to produce a visible image. For this purpose, the phosphor should store as much as possible of the incident X-ray energy and emit as little as possible of the stored energy until stimulated by the scanning beam. This is called "digital radiography" or "computed radiography."

Systems for computed radiography using storage phosphor technology are commercially available, e.g., under trade name ADC70, ADC Compact and ADC Solo from Agfa-Gevaert N.V., Mortsel, Belgium and under trade name FCR7000, FCR5000 and FCRAC1 from Fuji Film, Japan.

The market trend in computer radiography goes towards smaller, faster, less expensive, easy to use systems. Moreover, the need for direct access to the image, especially in medical diagnosis, is growing. Therefore, devices that are equipped with means for recording of the image made by penetrating radiation and with means for reading the image so that the recording and the reading of the image can proceed almost simultaneously are very desirable.

Systems fulfilling, at least partially, this need have been proposed and are based, e.g. on α-Si detectors combined with prompt emitting phosphor layers and coupled to thin film transistors or on amorphous Se as recording medium.

Further improvement is still desired and a system combining the advantages of storage phosphor technology (a.o. high X-ray absorption) with almost direct readability of the image would be a very interesting system both for use in medical diagnosis as in non-destructive testing with penetrating radiation.

OBJECTS AND SUMMARY OF THE INVENTION

It is an object of the invention to provide a method for recording and reproducing an image made by penetrating radiation using storage phosphor technology, wherein the step of stimulating the storage phosphor and collecting the stimulated light output can be performed in a compact, quite inexpensive and sturdy apparatus.

It is a further object of the invention to provide a method for recording and reproducing an image made by penetrating radiation using storage phosphor technology, wherein the step of recording the image in the storage phosphor and the stimulating of the storage phosphor can proceed almost simultaneously.

It is still another object of the invention to provide a device comprising a storage phosphor that can be used to store energy of penetrating radiation and to stimulate the storage phosphor almost simultaneously.

Further objects and advantages of this invention will become clear from the detailed description hereinafter.

The object of the invention is realized by providing a method for recording and reproducing a radiation image comprising the steps of:

i. causing a radiation image storage panel containing a photostimulable phosphor to absorb penetrating radiation having passed through an object or having been radiated from an object, ii. exposing said image storage panel to stimulating rays to release the radiation energy stored therein as light emission, iii. detecting the emitted light, characterized in that said stimulating rays are emitted by an electroluminescent element.

DETAILED DESCRIPTION OF THE INVENTION

Figure 1:
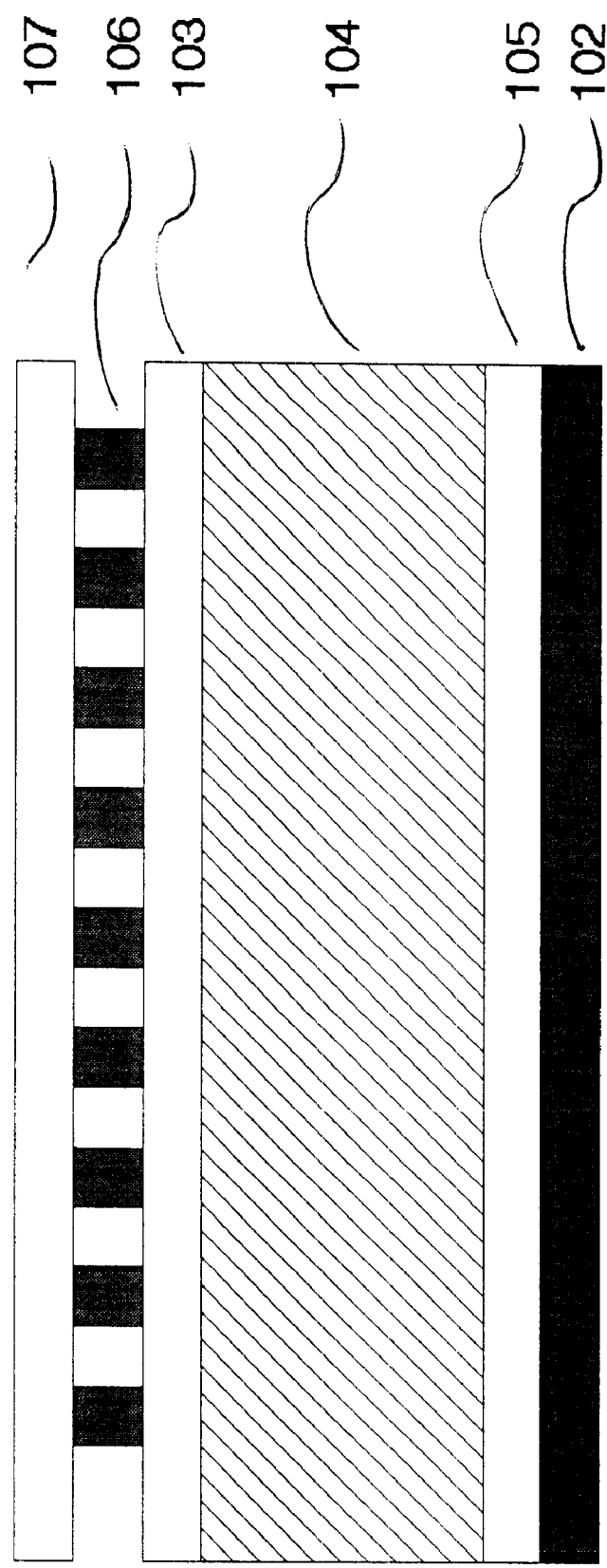
FIG. 1 shows schematically a pixel-wise driven electroluminescent element useful in this invention.

In this document the term "X-ray" has to be understood as any penetrating radiation and includes Ira. radiation originating from a radioisotope (e.g. Co60, Ir192, Se75, etc.), radiation created by an X-ray generator of any type, radiation and high energy particles created by a high energy radiation generator (e.g. Betatron), radiation from a sample labeled with a radioisotope as is the case in, e.g., autoradiography.

In "computed radiography" or "digital radiography" a photostimulable phosphor is exposed to incident pattern-wise, modulated X-rays and as a result thereof temporarily stores therein energy contained in the X-ray radiation pattern. At some interval after the exposure, a beam of visible or infrared light scans the panel to stimulate the release of stored energy as light that is detected and converted to electrical signals which can be processed to produce a visible image. The scanning beam can originate from a laser beam that is scanned over the phosphor by a spinning polygon mirror that is moved over the phosphor or from a small diode or solid state laser that is moved as such over the phosphor. In both cases, the accuracy of the scanning in the device for reading the stored image and converting it into electric signals (further on in short called 'reader'), which is an important factor in achieving high image quality, is sensitive to vibrations since small vibrations of the scanning device can provoke quite large deviation in scanning accuracy. Thus, the scanning device has to be carefully mounted in the reader so that the risk of vibrations is minimized or the reader itself has to be isolated from vibrations. When the stimulation of a storage phosphor could be performed in a reader with less moving parts as in the present readers, this reader would be sturdier and less sensitive to vibrations so that the reader could be made less expensive without sacrificing on image quality.

It was found that energy of penetrating radiation stored in storage phosphors could be stimulated by the light of electroluminescent elements (EL-elements). EL-elements for use in a method according to this invention have at least one of the electrodes that is transparent to the light emitted by the EL-element under influence of an electric field. The EL-element, useful in this invention, can be a two-dimensional element as well as a uni-dimensional (line-shaped) element. The EL-element useful in this invention, both the two-dimensional and the uni-dimensional element, can be an element that emits light over the total area of the element as well as a pixel-wise driven element. A pixel-wise driven EL-element, useful in this invention, may be of the passive matrix type as well as of the active matrix type. Since the EL-element is only intended to stimulate a storage phosphor, it is only needed to drive the element on an on or out basis (binary driven). Thus, the driver can be made quite simple even for a pixel-wise driven EL-element.

In the method according to this invention, a storage phosphor panel (supported or self-supporting) is being exposed to X-rays, storing part of the energy of the X-rays and then brought in such a position with respect to the EL-element that the light emitted by the EL-element can reach the storage phosphor and stimulate the phosphor to release the stored energy. By doing so, at least part of the stored energy is released as stimulation light. The amount of stimulated light is proportional to the amount of energy stored in the storage phosphor. The stimulated light can then be captured and converted to an electric signal for further processing.

The method of the present invention can be implemented in different embodiments.

A first embodiment of the method of this invention.

In a first embodiment of the method of this invention, the EL-element is not pixel-wise driven. In such an EL-element, a layer with an electroluminescent compound is placed between two continuous electrodes, at least one of these being a transparent electrode. When an electric field is applied over the layer with the electroluminescent compound, the latter emits light over the whole area of the element. The EL-element for use in this first embodiment of the method of this invention can be basically line shaped or can be two-dimensional.

A storage phosphor panel having a transparent support carrying a storage phosphor layer or a self-supporting phosphor panel is, after being exposed to penetrating radiation, brought near to or in contact with the line-shaped EL-element that emits light over the total length of the line. The transparent electrode of the EL-element faces one side of the storage phosphor panel. The stimulated light leaves the storage panel at the side opposite to the EL-element and is captured by capturing means arranged for capturing the light pixel-wise.

The capturing means can be a line-shaped array or a two-dimensional matrix of charge couple devices (CCD's), a matrix of gaseous photon detectors or a line or matrix shaped detector containing α-si coupled to TFT's (Thin Film Transistors).

Very useful gaseous detectors for use as means for pixel-wise capturing the stimulated light have been disclosed in, e.g., EP-A 846 962. In that disclosure an X-ray image detector comprising a two-dimensional position-sensitive, gaseous photon detector is disclosed comprising an X-ray sensitive storage means for storing an X-ray image, which storage means is capable of emitting image-wise modulated light-and two-dimensional position-sensitive gaseous photon detector, arranged to detect said image-wise modulated light, said two-dimensional position sensitive gaseous photon detector comprising a photocathode arranged for receiving image-wise modulated light emitted by said storage means and being operative to provide in response to said image-wise modulated light an output of electrons, a gaseous electron multiplier being operative on the output of electrons from said photocathode to provide an electron avalanche comprising an increased number of electrons, an electrode assembly comprising at least one anode and at least one cathode, said electrode assembly being arranged to collect electrons produced by said electron multiplier.

The stimulated light can be coupled to the capturing means by means of a self-focusing lens or by means of an array of tapered or non-tapered optical fibers. When using a line-shaped capturing means, this is preferably as long as the longest dimension of the line-shaped EL-element, which in turn is preferably as long as one of the two dimensions of the storage panel to be stimulated. When the dimensions of the pixel-wise capturing means are smaller than the dimensions of the EL-element, the stimulated light can be guided to the pixel-wise capturing means by tapered optical fibers. Means and ways of capturing the stimulated light from a storage phosphor panel with CCD's are disclosed in European Application 98200152.1 filed on Jan. 20, 1998, titled "Method for obtaining an electrical representation of a radiation image using CCD sensors". When the light emitted by the storage phosphor panel upon stimulation by a line-shaped EL-element is captured by a line-shaped capturing means, the line-shaped EL-element is moved over the storage phosphor panel synchronously with the pixel-wise capturing means for stimulated light. Alternatively, the storage phosphor plate can be moved between the EL-element and the means for pixel-wise capturing the stimulated light. In this case the EL-element and the line-shaped capturing means can be rigidly positioned opposite to each other leaving a gap wherein the storage phosphor panel can be moved.

The light emitted by the storage phosphor panel upon stimulation by a line-shaped EL-element can also be captured by a two-dimensional capturing means. The capturing means can be a two-dimensional matrix of charge couple devices (CCD's), a two-dimensional matrix of a gaseous photon detectors or a two-dimensional detector containing α-Si coupled to TFT's (Thin Film Transistors). The stimulated light can be coupled to the two-dimensional capturing means in the same way as described immediately above for capturing the stimulated light by a line-shaped capturing means. It is preferred that the area of the two-dimensional pixel-wise light capturing means is large enough to cover at least the total area of the phosphor panel that is stimulated. In that case, only the line-shaped EL-element is moved over the storage phosphor panel. The pixel-wise two-dimensional light capturing means having an area large enough to cover at least the total area of the phosphor panel that is stimulated can be a single light capturing means, or can be made up by juxtaposition of several smaller capturing means. Such means made up by juxtaposition of several smaller capturing means has been disclosed in European Application 98200152.1 filed on Jan. 20, 1998, titled "Method for obtaining an electrical representation of a radiation image using CCD sensors."

A second embodiment of the method of this invention.

In a second embodiment of this invention, the EL-element is pixel-wise driven. A pixel-wise driven EL-element, useful for carrying out the method of this invention, is schematically shown in FIG. 1. It comprises electrode strips forming the row electrodes (102), positioned basically parallel to each other and isolated from each other, a layer containing an electroluminescent compound (104), electrode strips, isolated from each other forming the column electrodes (106). These column electrodes (106) are positioned basically perpendicular to the row electrodes (102). The layer containing the electroluminescent compound is separated both from the row electrodes and the column electrodes by a dielectric layer (103, 105). On top of the column electrodes a protective layer (107) is present. Each of the row and column electrodes is coupled to a voltage source adapted for applying an electric potential to each of said electrodes separately. When one electrode strip on the support and one electrode strip on the phosphor are coupled to a voltage source, then the respective voltages are chosen such that an electric field with a field strength beyond the threshold for making the electroluminescent compound emit light is only reached where both electrodes cross. Thus in operation, e.g., a first voltage is applied to the first row electrode and a second voltage is consecutively applied to each of the column electrodes, thus light is emitted consecutively by all matrix points on the first row, then said first voltage is applied to the second row electrode and said second voltage is again consecutively applied to each of the column electrodes, thus light is emitted consecutively by all matrix points on the second row. Thus a dot of emitted light equal in size to the pixel created by the row and column electrodes travels over the entire surface of the electroluminescent panel and can pixel-wise stimulate the storage phosphor. The voltage source for driving the electrodes can be a DC source as well as an AC-voltage source, the latter being preferred. In such an EL-element, the column electrodes and/or the row electrodes are transparent.

The pixel-wise driven EL-element, for use in this invention, can be a line-shaped element, being one pixel wide. Preferably a line-shaped pixel-wise driven EL-element is one pixel wide and has a length at least equal to one of the dimensions of the storage phosphor panel to be stimulated. In such a line-shaped pixel-wise driven EL-element, there is only one row electrode needed. The line-shaped EL-element has to scan the storage phosphor, but again the movement is restricted to one direction. The pixel-wise driven EL-element can also be matrix shaped. In this case it has preferably an area at least as large as the area of the storage panel to be stimulated. In this case, large EL-elements are preferred, since storage phosphor screens for use in medical application can reach dimensions of 14"×17". Such a large EL-element can be a single element, or the large EL-element can be made by "tiling" from smaller modules. When a large, pixel-wise driven, EL-element is used in the method of this invention, the EL-element can be mounted rigidly and the phosphor plate can then be brought in position for being stimulated. When a pixel-wise driven EL-element is used in the method of this invention, the stimulated light can be captured by a light guiding member and be guided to a photomultiplier in the same way as it is done in methods wherein the storage phosphor panel is pixel-wise stimulated by a laser beam. The capturing means for the stimulated light as described above (a line or matrix type array of CCD's or a line or matrix type of a gaseous photon detector) can be used when the storage panel is stimulated by a pixel-wise driven EL-element. The pixel-wise driven EL-element for use in this invention can also be line operated and instead of a point of light traveling over the plate, a line of light travels over the plate. This is basically equal to the first embodiment of the invention where a non-pixel-wise driven EL-element is used and the stimulated light is captured by a line-shaped array of CCD's or gaseous photon detectors.

The method of the present invention is preferably carried out with a single device wherein the storage phosphor panel and the EL-element for stimulating the storage phosphor, are combined. Further on, such a device will be called a STOR/STIM device. In such a single device, the EL-element can be non-pixel-wise driven or pixel-device wise driven. Such a single device is exposed to penetrating radiation storing energy of this radiation in the storage phosphor part of the device, after the exposure to penetrating radiation, the electroluminescent part of the device is activated to emit stimulating rays for stimulating the storage phosphor and make this phosphor emit electromagnetic radiation that is captured for further processing to provide an image.

The advantage of using a STOR/STIM device with a non-pixel-wise driven EL-element rests, amongst other advantages, in the fact that the EL-element can be simple and that the reader, wherein the stimulated light is-captured, can be made with very few moving parts. A reader for a STOR/STIM device wherein the EL-element is non-pixel-wise driven can have a matrix shaped light detector (e.g. one of the types described above) with an area at least as large as the area of the STOR/STIM device rigidly fixed near a slot wherein the STOR/STIM device can be placed for stimulation. The storage part of the STOR/STIM device is placed in said slot-facing the matrix shaped light detector and in said slot contact points are provided to couple the electrodes of the EL-element to a voltage source. In such a reader wherein the capturing means for the stimulated light is a rigidly placed CCD matrix, a matrix of gaseous photon detectors or a detector with α-Si coupled to TFT's, the moving parts necessary are only those for accepting the STOR/STIM device and for ejecting it after reading. This makes it possible to construct a very compact reader.

A very interesting device for implementing the method of this invention is a device incorporating:

a non-pixel-wise driven EL-element;

a storage phosphor layer adjacent to the EL-element; and a matrix shaped capturing means for pixel-wise capturing the stimulated light.

In such a device, the EL-element, the storage phosphor layer and the matrix shaped capturing means have the same area. The matrix shaped light detector for pixel-wise capturing the stimulated light can be a two-dimensional matrix of charge couple devices (CCD's) as well as a two-dimensional matrix of gaseous photon detector.

Figure 2:
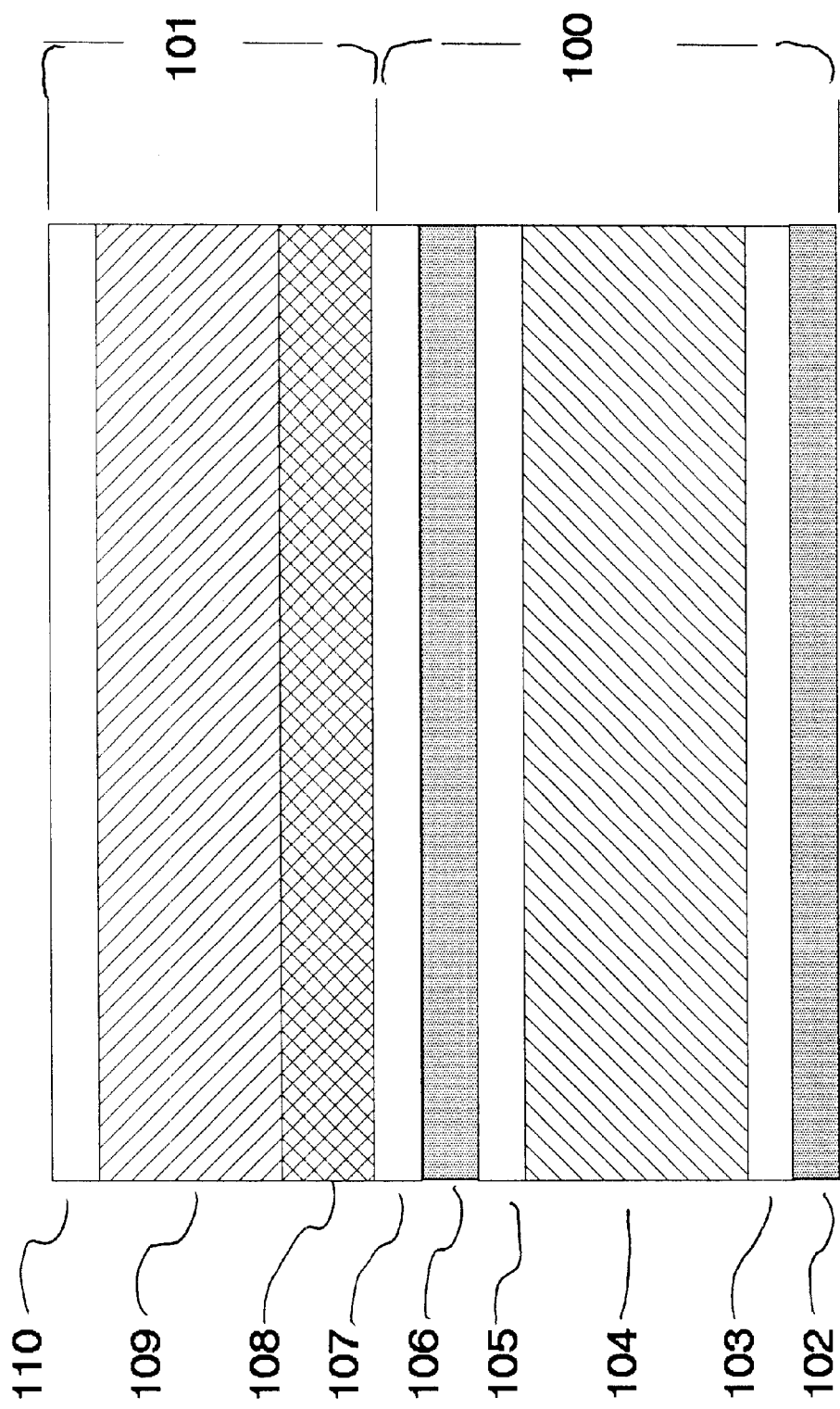
FIG. 2 shows schematically a single device wherein the storage phosphor panel and a pixel-wise driven EL-element, for stimulating the storage phosphor, are combined.

A STOR/STIM device can also be constructed with a pixel-wise driven EL-element as schematically shown in FIG. 2. In this Figure a schematic cross-section of such a device is shown wherein the cross-section crosses a row electrode. The device comprises an electroluminescent part (100) and a storage phosphor part (101). The electroluminescent part comprises row electrodes (102), an electroluminescent layer (104) and column electrodes (106). A dielectric layer (103) separates the electroluminescent layer (104) from the row electrodes (102), and a dielectric layer (105) separates the electroluminescent layer (104) from the column electrodes (106). On top of the row electrodes a protective layer (107), e.g. a plastic film, is present. The storage phosphor containing part (101) comprises a support (108) whereon a storage phosphor layer (109) is present. The storage phosphor layer is covered with a protective layer (110). In FIG. 2, the column electrodes (106) of the electroluminescent part (100) are placed near the storage phosphor part of the device; it is well possible to place the row electrodes of the electroluminescent part (100) near the storage phosphor part of the device. In any case, the electrodes of the electroluminescent part of the device according to this invention facing the storage phosphor part are transparent electrodes.

The phosphor part and the electroluminescent part can be glued together by an adhesive between the support (108) of the storage phosphor part and the protective layer (107). It is also possible to apply the storage phosphor directly on the protective layer (107) and to omit the support (108). Structuring the device in this way can increase the achievable image quality. Any other way of combining the electroluminescent part and the phosphor part of the device can be used as well, e.g. both parts can be kept together by electrostatic attraction, by clamping the sides of the device together, etc.

The electroluminescent device.

The electroluminescent element (EL-element) for use in the method of this invention can be a non-pixel-wise driven element. This is the most simple construction of the element, comprising basically a layer with an electroluminescent compound sandwiched between two dielectric layers and two electrodes, at least one of the electrodes being transparent.

When the EL-element for use in this invention is a pixel-wise driven one, both as a separate element only brought near the storage phosphor panel for stimulating it and as an element forming part of a single device, it has preferably a number of pixels so that a resolution better than 200 μm is obtained. Preferably the number of pixels is such that a resolution of at least 100 μm is obtained. The form of EL-element (pixel-wise driven as well as non-pixel-wise driven) for use in this invention can be uni-dimensional, i.e. it can be a line with considerable length being one pixel wide. In this case the electroluminescent element has to be moved over the storage phosphor panel, but compared to laser scanning as in the prior art readers for storage phosphor plates, a uni-dimensional EL-element has to be moved in one direction only, while the usual laser scanning needs movement in two directions.

Preferably a pixel-wise driven EL-element is a two-dimensional array of pixels and has an area at least as large as the storage phosphor panel to be scanned. In this case no physical movement is necessary. Only the light travels over the storage phosphor plate by sequentially switching the pixels of the EL-element on and off.

An EL-element for use in the method of this invention can be pixel-wise driven by a passive matrix electrode structure as well as by an active matrix electrode structure. An EL-element pixel-wise driven by an active matrix electrode structure is preferred for use in the method of this invention.

The EL-element, pixel-wise driven or not, for use in the method of the present invention can comprise any additional layer necessary for the functioning of it. It can, e.g., comprise isolating layers for isolating the electroluminescent compound from the electrodes, protective layers on top of the electrodes, barrier layers for protecting the element from moisture, etc.

Active matrix EL-elements useful in this invention have been disclosed in, e.g., U.S. Pat. No. 5,767.,623; U.S. Pat. No. 5,650,692, U.S. Pat. No. 5,712,528, etc. These are AC-driven thin film EL-elements (AC TFEL). Also, electroluminescent thick film materials as described in, e.g., WO 93/23972 are very useful in the method of this invention. The EL-elements for use in this invention need only to emit monochrome light.

In a non-pixel-wise driven EL-element to be used in the method according to this invention, at least one of the electrodes is transparent. In a pixel-wise driven EL-element to be used in the method according to this invention, the row electrodes or the column electrodes or both are transparent electrodes. Transparent electrodes can be made, e.g., of a transparent-support with a layer of indium-tin-oxide (ITO) or of a transparent support carrying a transparent conductive polymer, e.g. a layer made of pblyethylenedioxythlophene (PEDT), as disclosed in, e.g. EP-A-686 662, polypyrole, polyaniline, etc.

The electroluminescent compounds used, inorganic as well as organic, are chosen with respect to the stimulation properties of the storage phosphor to be stimulated. E.g., the electroluminescent compound used to stimulate a storage phosphor with a maximum stimulability in the red region of the visible spectrum will incorporate an electroluminescent compound with a light emission tuned to match said wavelength region.

The use of an EL-element comprising an inorganic electroluminescent compound (an electroluminescent phosphor) to stimulate a storage phosphor in a method according to this invention is preferred since such devices require generally lower voltage for its activation.

Red emitting phosphors, useful in an element for use in a method of this invention, are e.g., ZnS:Mn, a Mn activated fluorphlogopite phosphor with formula $KMg_3(Si_3Al)O_{10}F_2$:Mn as disclosed in U.S. Pat. No. 5,582,768, and SrS:Eu.

Blue-Green emitting phosphors, useful in an element for use in a method of this invention, are e.g., SrS:Ce.

Green-emitting phosphors, useful in an element for use in a method of this invention, are, e.g. a Tb activated fluorphlogopite phosphor with formula $KMg_3(Si_3Al)O_{10}F_2$:Tb or a Ti activated fluorphlogopite phosphor with formula $KMg_3(Si_3Al)O_{10}F_2$:Ti as disclosed in U.S. Pat. No. 5,582,768.

Blue emitting phosphors, useful in an element for use in a method of this invention are e.g., $Sr_xCa_{1-x}Ga_2S_4$:Ce with $0 \leq x \leq 1$, phosphors as described in U.S. Pat. No. 5,598,059, with formula $M^{2+}M^{3+}_2X_4$:RE, wherein $M^{2+}$ is a metal selected from the group consisting of Mg, Ca, Sr, and Ba, $M^{3+}$ is a metal selected from the group consisting of Al, Ga and In, X is an element selected from the group consisting of Se and S and RE is an activator selected from the group consisting of Ce and Eu, a Ti-activated α-Zirconiumphosphate phosphor with formula $Zr_{1-x}Ti_x(HPO_4)_2 \cdot H_2O$ as disclosed in U.S. Pat. No. 5,582,768. Also blue:emitting phosphorsas ZnS:Tb can be used in an EL-element for use in this invention.

Further useful electroluminescent phosphors, in an element for use in a method of thisinvention, have been disclosed in U.S. Pat. No. 5,616,285 wherein electroluminescent phosphors based on lamellar intercalation compounds doped with various dopants to select the emission color of the doped compound are disclosed.

The storage phosphors.

All hitherto known storage phosphors, e.g. bariumfluorohalide phosphors, alkali metal halide phosphors, elpasolites, halosilicates, halogermanates, etc. can be used in storage panels that are used in a method according to this invention.

Divalent europium-doped bariumfluorohalide phosphors may be used, wherein the halide-containing portion may be
(1) stoichiometrically equivalent with the fluorine portion as e.g. in the phosphor described in U.S. Pat. No. 4,239,968,
(2) substoichiometrically present with respect to the fluorine portion as described e.g. in EP-A-021 342 or EP-A-345 904 and U.S. Pat. No. 4,587,036, or
(3) superstoichiometrically present with respect to the fluorine portion as described e.g. in U.S. Pat. No. 4,535,237. Other divalent europium activated barium fluorobromide phosphors that can be used in storage screens, comprising a polymer according to the present invention, have been described in EP-A 533 236 and in the corresponding U.S. Ser. No. 07/941,167.

Also, divalent europium-doped bariumfluorohalide phosphors comprising high amounts of iodide as disclosed in e.g. EP-A-835 920can beneficially be used in a method according to this invention.

Still other divalent europium activated barium fluorobromide phosphors that can be used in a method according to the present invention, have been described in EP-A-533 234.

Particularly suitable divalent europium barium fluorobromide phosphors for use in storage screens to be used in a method according,to this invention correspond to the empirical formula (I) of EP-A 533 236 and contain in addition to the main dopant $Eu^{2+}$ at least one alkali metal, preferably sodium or rubidium, as co-dopant. Other particularly suitable barium fluorobromide phosphors contain in addition to the main dopant $Eu^{2+}$ at least Sm as co-dopant as described in EP-A-533, 233.

The use of needle shaped phosphors in storage panels to be used in a method of this invention is very beneficial. In such panel the needles are perpendicular to the plane of the panel and the needle shaped phosphor particles can act as a kind of light guide for the light that is stimulated in the particles, so that the sharpness of the storage-phosphor panel is enhanced. Forming needle shaped phosphor crystals on a storage phosphor panel can be achieved by vacuum deposition of phosphor material on a substrate. However, this method produces the best results when phosphor crystals with high crystal symmetry are used. Especially well suited are simple alkali-metal phosphors such as e.g. KBr:In, RbBr:Tl, CsBr:Ga. Typical very useful storage phosphor that can be vacuum deposited have been disclosed in EP-A-751 200. This disclosure describes storage phosphors with formula $M^{1+}X.aM^{2+}X'_2bM^{3+}X'_3:cZ$ wherein:

$M^{1+}$ is at least one member selected; from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$.

The stimulation of the storage phosphor by the EL-element can proceed from one side of the storage phosphor panel, and the reading of the emitted light can proceed on the other side of the phosphor panel.

The storage phosphor can be incorporated in any storage phosphor panel known in the art. It is preferred, in the method of this invention, to use a self-supporting storage panel or a panel wherein the storage phosphor is carried on a transparent support. The transparent support can be colored by pigments or dye or can be colorless.

A device for storing energy of penetrating radiation and releasing at least a portion of said energy after stimulation, and wherein a storage phosphor part and an electroluminescent part are combined (further on for short called "a STOR/STIM device") can beneficially be used to build an exposure unit wherein it is combined with a collector for the light emitted by the storage phosphor part upon stimulation by the electroluminescent part.

Thus this invention encompasses a method for recording and reproducing a radiation image comprising the steps of:
i) placing a STOR/STIM device, having a part containing a storage phosphor and an electroluminescent part, near a source of penetrating radiation, placing an object (in medical imaging a patient) between said source and said STOR/STIM device, said STOR/STIM device being positioned so that said electroluminescent part faces said object,
ii) placing a collector for stimulated light near said STOR/STIM device, said collector facing said storage phosphor part,
iii) exposing said object and said STOR/STIM device to penetrating radiation,
iv) stopping said exposure and activating said electroluminescent part of said STOR/STIM device for stimulating said storage phosphor and making it emit stimulated light, and
v) collecting said stimulated light in said collector.

A method as described immediately above has the advantage that it is possible to expose the object to a portion of the radiation dose necessary, e.g., 5% of the total dose, then stopping the exposure and stimulating the storage phosphor and collecting the stimulated light and processing it to form an image on a monitor so that the X-ray technician can check whether or not the positioning of the object is right before giving the full exposure.

In the method described immediately above, the electroluminescent,part of the STOR/STIM device can be both 1pixel-wise driven and non-pixel-wise driven. The collector for stimulated light can be a pixel-wise collecting means or a non-pixel-wise collecting means. All combinations of electroluminescent element and capturing means for stimulated light, described earlier on in this document, can be used in the method described, immediately above.

What is claimed is:
1. A method, for recording and reproducing a radiation image comprising:
i) causing a radiation image storage panel containing a photostimulable phosphor to absorb penetrating radiation having passed through an object or having been radiated from an object and storing energy from said penetrating radiations,
ii) exposing said image storage panel to stimulating rays, emitted by a pixel-wise driven electroluminescent element comprising an electroluminescent phosphor emitting light in a wavelength range between 500 and 900 nm, to release said energy stored therein as a stimulated light emission, and
iii) detecting said emitted stimulated light.
2. A method according to claim 1, wherein said photostimulable phosphor is a phosphor selected from the group consisting of bariumfluorohalide phosphors, alkali metal halide phosphors, elpasolites, halosilicates and halogermanates.

3. A method according to claim 1, wherein said detecting said emitted stimulated light proceeds pixel-wise by at least one two-dimensional CCD sensor.

4. A method according to claim 2, wherein said detecting said emitted:stimulated light proceeds pixel-wise by at least one two-dimensional CCD sensor.

5. A method according to claim 1, wherein said detecting said emitted stimulated light proceeds pixel-wise by at least one two-dimensional gaseous photon detector.

6. A method according to claim 2, wherein said detecting said emitted stimulated light proceeds pixel-wise by at least one two-dimensional gaseous photon detector.

7. A method, for recording and reproducing a radiation image comprising:
   i) causing a radiation image storage panel containing a photostimulable phosphor to absorb penetrating radiation having passed through an object or having been radiated from an object and storing energy from said penetrating radiations,
   ii) exposing said image storage panel to stimulating rays, emitted by a pixel-wise driven electroluminescent element comprising an electroluminescent phosphor emitting light in a wavelength range between 500 and 900 nm, to release said energy stored therein as a stimulated light emission, and
   iii) detecting said emitted stimulated light.

8. A method according to claim 7, wherein said photostimulable phosphor is a phosphor selected from the group consisting of bariumfluorohalide phosphors, alkali metal halide phosphors, elpasolites, halosilicates and halogermanates.

9. A method according to claim 7, wherein said detecting said emitted stimulated light proceeds pixel-wise by at least one two-dimensional CCD sensor.

10. A method according to claim 8, wherein said detecting emitted stimulated light proceeds pixel-wise by at least one two-dimensional CCD sensor.

11. A method according to claim 7, wherein said detecting said emitted stimulated light proceeds pixel-wise by at least one two-dimensional gaseous photon detector.

12. A method according to claim 8, wherein said detecting said emitted stimulated light proceeds pixel-wise by at least one two-dimensional gaseous photon detector.

13. A device for recording and reproducing a radiation image comprising a part containing a photostimulable phosphor coupled to a pixel-wise driven electroluminescent part.

14. A device according to claim 13, wherein said part containing a photostimulable phosphor has a photostimulable phosphor on a support and is coupled to said electroluminescent part over said support.

15. A device according to claim 13, wherein said electroluminescent part has a protective layer and said photostimulable phosphor is applied directly to said protective layer.

16. A method of recording and reproducing a radiation image comprising:
   i) placing a STOR/STIM device, having a part containing a storage phosphor combined with a pixel-wise driven electroluminescent part or a non-pixel-wise driven electroluminescent part, near a source of penetrating radiation, said STOR/STIM device being positioned so that said pixel-wise driven electroluminescent part or said non-pixel-wise driven electroluminescent part faces an object,
   ii) placing a collector for stimulated light near said STOR/STIM device, said collector facing said storage phosphor part,
   iii) exposing said object and said STOR/STIM device to penetrating radiation,
   iv) stopping said exposure and activating said pixel-wise driven electroluminescent part or said non-pixel-wise driven electroluminescent part of said STOR/STIM device for stimulating said storage phosphor and making said storage phosphor emit stimulated light, and
   v) collecting said stimulated light in said collector.

17. A device for recording and reproducing a radiation image comprising a part containing a photostimulable phosphor coupled to a non-pixel-wise driven electroluminescent part.

18. A device according to claim 17, further comprising a matrix shaped capturing means for pixel-wise capturing a stimulated light emission from said photostimulable phosphor.

19. A device according to claim 17, wherein said part containing a photostimulable phosphor has a photostimulable phosphor on a support and is coupled to said electroluminescent part over said support.

20. A device according to claim 18, wherein said part containing a photostimulable phosphor has a photostimulable phosphor on a support and is coupled to said electroluminescent part over said support.

21. A device according to claim 17, wherein said electroluminescent part has a protective layer and said photostimulable phosphor is applied directly to said protective layer.

22. A device according to claim 18, wherein said electroluminescent part has a protective layer and said photostimulable phosphor is applied directly to said protective layer.

* * * * *

UNITED STATES PATENT AND TRADEMARK OFFICE
CERTIFICATE OF CORRECTION

PATENT NO. : 6,392,249 B1
DATED : May 21, 2002
INVENTOR(S) : Luc Struye et al.

It is certified that error appears in the above-identified patent and that said Letters Patent is hereby corrected as shown below:

Title page,
Item [30], Foreign Application Priority Data, "Oct. 13, 1998 (EP)" should read -- Nov. 10, 1998 --.

Column 1,
Line 12, "It," should read -- It --.

Column 2,
Line 52, ", modulated" should read -- modulated --.

Column 3,
Line 66, "α-si" should read -- α-Si --.

Column 4,
Line 8, "light-and" should read -- light and --.

Column 6,
Line 13, "element" should read -- element, --.
Line 27, "is-captured" should read -- is captured --.
Line 35, "slot-facing" should read -- slot facing --.

Column 7,
Line 67, "5,767.623" should read -- 5,767,623 --.

Column 8,
Line 13, "transparent-support" should read -- transparent support --.
Line 15, "pblyethylenedioxythlophene" should read -- polyethylenedioxythiphene --.
Line 54, "blue:emitting phosphorsas" should read -- blue emitting phosphors as --.
Line 57, "thisinvention" should read -- this invention --.

Column 9,
Line 18, "920can" should read -- 920 can --.
Line 24, "according,to" should read -- according to --.
Line 37, "storage-phosphor" should read -- storage phosphor --.
Line 47, "$M^{+1}X.aM^{2+}X'_2bM^{3+}X'_3:cZ$" should read -- $M^{+1}X.aM^{2+}X'_2bM^{3+}X''_3:cZ$ --.

UNITED STATES PATENT AND TRADEMARK OFFICE
CERTIFICATE OF CORRECTION

PATENT NO. : 6,392,249 B1
DATED : May 21, 2002
INVENTOR(S) : Luc Struye et al.

It is certified that error appears in the above-identified patent and that said Letters Patent is hereby corrected as shown below:

<u>Column 10,</u>
Line 6, "stimulation," should read -- stimulation --.
Line 41, "electroluminescent,part" should read -- electroluminescent part --.
Line 47, "described,immediately" should read -- described immediately --.

Signed and Sealed this

Fourth Day of February, 2003

JAMES E. ROGAN
*Director of the United States Patent and Trademark Office*